(12) United States Patent
McGee et al.

(10) Patent No.: US 7,404,516 B2
(45) Date of Patent: Jul. 29, 2008

(54) TAMPER RESISTANT PRESENTATION INSTRUMENTS AND METHODS

(75) Inventors: Chris McGee, Parker, CO (US); Keith Newbrough, Parker, CO (US); Kevin Harte, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/117,606

(22) Filed: Apr. 27, 2005

(65) Prior Publication Data

US 2006/0243791 A1  Nov. 2, 2006

(51) Int. Cl.
*G06K 5/00* (2006.01)
(52) U.S. Cl. .................................... 235/380
(58) Field of Classification Search ............... 235/380
See application file for complete search history.

(56) References Cited

U.S. PATENT DOCUMENTS

| | | | | |
|---|---|---|---|---|
| 4,614,861 A | * | 9/1986 | Pavlov et al. | 235/380 |
| 4,667,087 A | * | 5/1987 | Quintana | 235/380 |
| 5,623,552 A | * | 4/1997 | Lane | 382/124 |
| 2002/0012445 A1 | * | 1/2002 | Perry | 382/100 |
| 2003/0150919 A1 | * | 8/2003 | Blank | 235/487 |
| 2004/0144846 A1 | * | 7/2004 | Lasch et al. | 235/487 |
| 2005/0161512 A1 | * | 7/2005 | Jones et al. | 235/487 |
| 2005/0205665 A1 | * | 9/2005 | Lasch et al. | 235/380 |
| 2006/0230661 A1 | * | 10/2006 | Bekker | 40/633 |

* cited by examiner

*Primary Examiner*—Karl D. Frech
*Assistant Examiner*—Tae W Kim
(74) *Attorney, Agent, or Firm*—Townsend and Townsend Crew LLP

(57) ABSTRACT

In one embodiment, a presentation instrument comprises a card body having machine readable information stored thereon. A protective device is coupled to the card body so as to be disposed over at least a portion of the machine readable information such that the machine readable information is incapable of being read by a machine when the protective device is in place and the machine readable information is readable by a machine when the protective device is removed.

2 Claims, 2 Drawing Sheets

TAMPER RESISTANT PRESENTATION INSTRUMENTS AND METHODS

BACKGROUND OF THE INVENTION

This invention is generally related to presentation instruments, such as credit cards, debit cards, stored value cards and the like. More specifically, the invention is related to such presentation instruments that are provided with protective devices or other schemes to prevent the fraudulent use or activation of such presentation instruments.

The use of presentation instruments to access financial accounts is well known. Examples of such presentation instruments include credit cards, debit cards, ATM cards, phone cards, so-called gift cards, and the like. Such cards typically contain an account number in some form or another that permits the card holder to gain access to their account, such as when making a purchase.

One common way to store the account information is through the use of a magnetic stripe that extends lengthwise along the card. To read the card, a point of sale device, such as the one described in copending U.S. application Ser. No. 10/116,689, filed Apr. 3, 2002, incorporated herein by reference, may be used. The account identifier that is read from the card may then be electronically transmitted to a processing system in order to complete the transaction.

Another way to store the account information is by using a bar code that is read using a bar code reader. Other forms of storage devices include smart chips, RFID tags, MICR lines, and the like.

One problem experienced when using presentation instruments is that they are susceptible to fraud. Integral to fraudulent activity is the ability of the criminal to access account information from the storage device, such as from the magnetic stripe. For instance, those inclined to criminal activity may attempt to duplicate a lost or stolen card, or simply to produce fraudulent cards from blank stock or other cards having a magnetic strip.

Hence, there is a need to insure that a presentation instrument has not been tampered with or duplicated prior to performing a transaction, such as when activating an account.

BRIEF SUMMARY OF THE INVENTION

In one embodiment, the invention provides a presentation instrument that comprises a card body having machine readable account information stored thereon. A protective device is coupled to the card body so as to be disposed over at least a portion of the machine readable account information. In this way, the machine readable account information is incapable of being read by a machine when the protective device is in place, and the machine readable account information is readable by a machine when the protective device is removed. In some cases, the protective devices may destruct or be modified when removed so that the account identifiers cannot be read by unauthorized people who then replace the protective device. In other cases, unauthorized removal and/or reapplication of the protective device may destroy and/or modify the account information or the visual appearance of the presentation instrument.

A variety of media may be used to store the account information. For example, in one embodiment, the media may comprise a magnetic stripe formed on the card body, and the machine readable information is stored on the magnetic stripe. Other examples include bar codes, RFID tags, smart chips, and the like.

In some aspects, the protective device may comprise a sheath that is secured to the card body at opposite sides of the machine readable account information. In another aspect, the protective device may comprise a strip of material that covers the machine readable account information. For example, a strip of tape may be secured over the magnetic stripe. Language may be provided on the card body to warn when the protective device has been removed.

In another embodiment, the invention provides an exemplary method for producing a presentation instrument. According to the method, machine readable account information is encoded on the presentation instrument. At least a portion of the account information is covered with a protective device. Examples of protective devices include removable sheaths, strips, and the like that completely cover or only partially cover the account information.

The invention further provides a method for activating a financial account. The method utilizes a presentation instrument that comprises a card body having account information stored thereon, and a protective device that is removably coupled to the card body so as to be disposed over at least a portion of the account information. The protective device is removed to enable reading of the account information, and the account information is read using a reader. The account information is transmitted to an account activation system to activate the account.

In one aspect, the account information is stored on a magnetic stripe, and the presentation instrument is swiped through the reader. In another aspect, the account information is stored in the form of a bar code, and the bar code is read with the reader.

In a further aspect, the protective device comprises a sheath that is secured to the card body at opposite sides of the account information. The sheath is pulled from the presentation instrument prior to reading the account information. Alternatively, the protective device comprises a strip of material that covers the account information, and the removing step comprises pulling the strip from the presentation instrument.

As part of activating the account, a value may be associated with the account information. Also, a payment may be collected prior to associating the value.

In yet another embodiment, the invention provides a presentation instrument that comprises a card body having machine readable account information disposed thereon. An authentication indicia is formed on the card body. Examples of authentication indicia include human readable verification information disposed over the machine readable account information and a human identifiable stripe formed in the card body.

In one aspect, a magnetic stripe is formed on the card body, and the verification information and the machine readable account information are stored on the magnetic stripe. In some cases, the verification information may be formed using a shifting ink or an ink that is visible under certain light conditions.

DETAILED DESCRIPTION OF THE INVENTION

Figure 1:
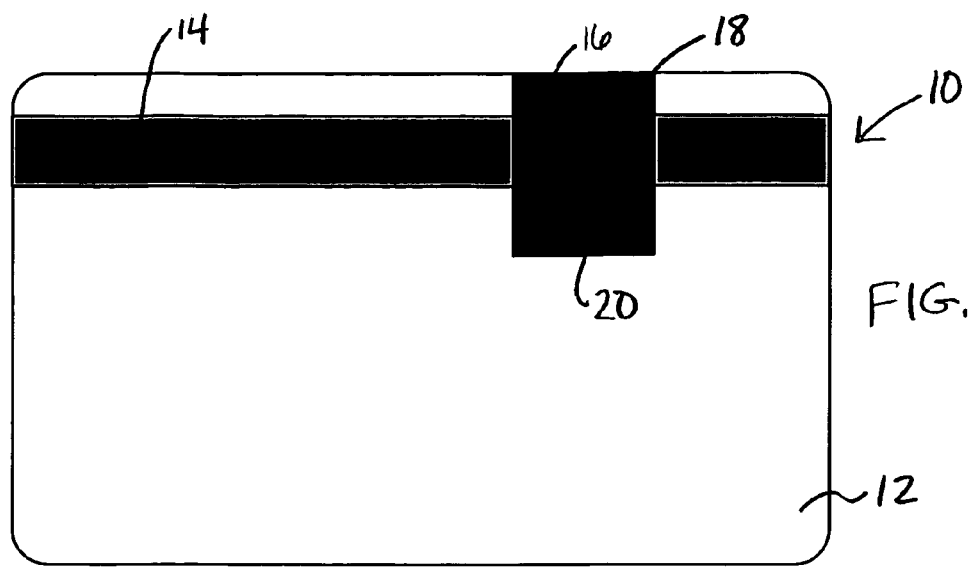
FIG. 1 illustrates one embodiment of a presentation instrument having a protective sheath according to the invention.

The invention provides various techniques and devices for preventing the unwanted duplication or production of presentation instruments. The presentation instruments may be constructed of any type of material capable of storing account information, either in print or electronically. Examples of materials include plastics, paper, card stock, laminates, and the like. One traditional type of presentation instrument is a plastic CR80 card. The account information may be stored in a variety of formats, including, but not limited to, bar codes, magnetic stripes, smart card chips, RFID tags, alphanumeric characters, and the like as is known in the art. The account information may be read from the presentation instruments using a variety of equipment known in the art, such as point of sale devices having bar code readers, magnetic stripe readers, RFID readers, microchip readers and the like.

To prevent or hinder copying of the account information, unwanted activation, unwanted use or the like, a protective device may be placed over some or all of the account information. In this way, the account information is unreadable, either by human eyes or a machine reader, while the protective device in is place. If the protective device is removed prior to activating the account by somebody other than an authorized activator, then the activator knows not to activate the account because it may have been compromised or copied. For example, with so-called gift cards, the accounts may be inactive until activated by reading the account information from the card. The account information is transmitted from a point of sale device to a host computer system that activates the account and associates a value with the account (if not already pre-assigned). If a person asks to activate a card that does not have its protective device in place, the clerk can simply confiscate the card or refuse to activate it. If the protective device is in place, the clerk simply removes the protective device, reads the account information from the card using a reader and transmits it to the host for activation.

A variety of protective devices may be used to prevent reading of the account information. This may include one or more pieces of material that are removably secured to the presentation instrument to interfere with reading of the account information by human eyes or equipment designed to read such information. The material may be configured to destruct or be incapable of being put back on the presentation instrument to prevent reading of the account information and then placement of the material back in its original position. Examples of such materials include curl-up tape, scored materials that tear apart when removed, and the like.

The invention also provides techniques for verifying that a presentation instrument is constructed from authentic stock materials. This is intended to prevent or hinder producing fake presentation instruments from generic stock materials and then placing account information on the cards. This may be accomplished by incorporating some type of authentication indicia into or on the presentation instruments. This may be a thread a strip or other configuration of material incorporated into the card stock, markings placed on the card stock or over the account information, and the like.

Referring now to FIG. 1, one embodiment of a presentation instrument 10 will be described. Presentation instrument 10 comprises a card body 12 that is constructed of a plastic material, although other materials may be used as well. Disposed across card body 12 is a magnetic stripe 14 as is known in the art. Recorded on the magnetic stripe 14 may be account information, such as an account number. Other information may include cardholder name, expiration dates, loyalty information and the like. The information stored on magnetic stripe 14 is readable by a point of sale device that in turn transmits the account information to a host computer for account activation, for adding value to an account, to make redemptions or purchases, and the like. The opposite side of card body 12 may include the name of a retail establishment, logos, advertising information and the like.

Disposed over a portion of magnetic stripe 14 is a protective sheath 16 that is used to cover at least a portion of the account information. Sheath 16 is attached to card body 12 at attachment points 18 and 20. When attached, some or all of the account information is incapable of being read by traditional magnetic stripe readers, such as those incorporated into existing point of sale devices. In this way, the account number may not be fraudulently copied until the account is activated or put into use by a legitimate cold holder.

Figure 2:
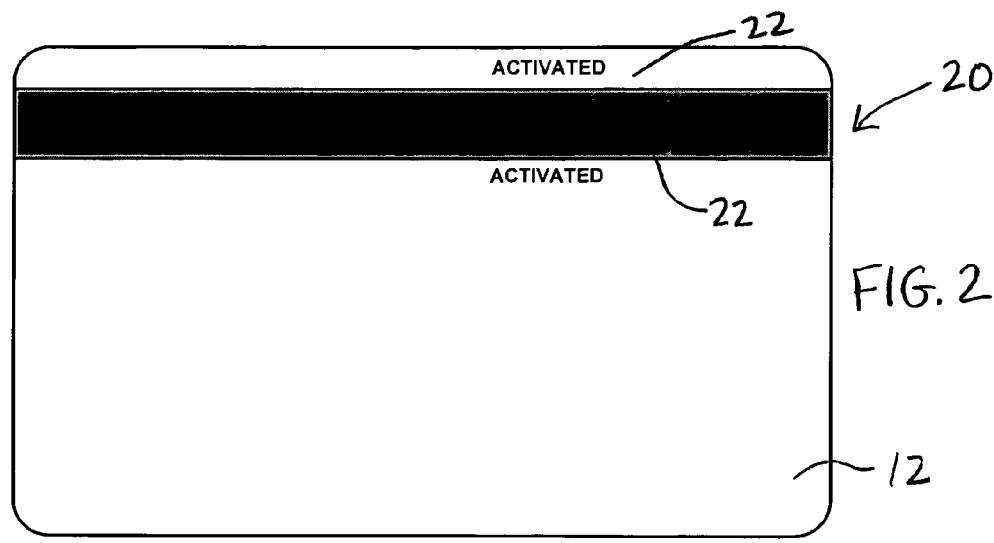
FIG. 2 illustrates the presentation instrument of FIG. 1 with the protective sheath removed.

When the presentation instrument 10 is ready to have its associated account activated or used for the first time, sheath 16 is removed from card body 12, such as by tearing it or pulling it off. In so doing, some or all of sheath 16 may be destroyed so that it cannot be put back onto card body 12. For example, sheath 16 could tear away at attachment points 18 and 20. After removal, card body 12 may optionally have information 22 indicating that the card has been activated as illustrated in FIG. 2.

When presentation instrument 10 comprises a gift card, it may be activated by presenting the card at a point of sale and making payment. The card is inspected by the clerk to ensure that sheath 16 is still attached. If not, the clerk may refuse to activate the account that is associated with the card. If intact and not tampered with, the clerk removes sheath 16, collects payment and reads the magnetic stripe 14 with a card reader. The account information read by the card reader is transmitted to a host computer system to activate the account for a certain value. One example of how to activate and use such a card is described in copending U.S. application Ser. No. 10/665,994, filed Sep. 19, 2003 for "Financial Presentation Instruments with Integrated Holder and Methods for Use," the disclosure of which is herein incorporated by reference.

Figure 3:
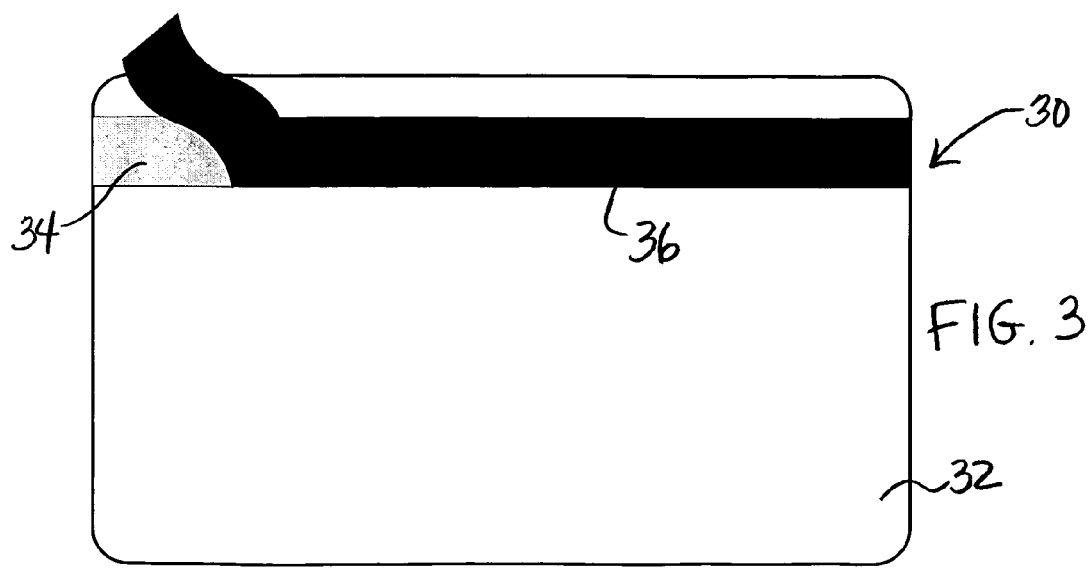
FIG. 3 illustrates another embodiment of a presentation instrument having a removable strip according to the invention.

Referring to FIG. 3, another embodiment of a presentation instrument 30 is shown. Presentation instrument 30 comprises a card body 32 having a magnetic stripe 34 similar to presentation instrument 10. Disposed across magnetic stripe 34 is an adhesive strip 36 that prevents reading of any information on magnetic strip 34 until removed. When ready to activate or use presentation instrument 30, strip 36 is peeled off magnetic stripe 34 as shown. When peeled off, strip may include markings, such as an ink that appears, to indicate it has been removed. Alternatively, strip 36 could roll up so that it cannot be replaced. Other schemes are possible.

Figure 4:
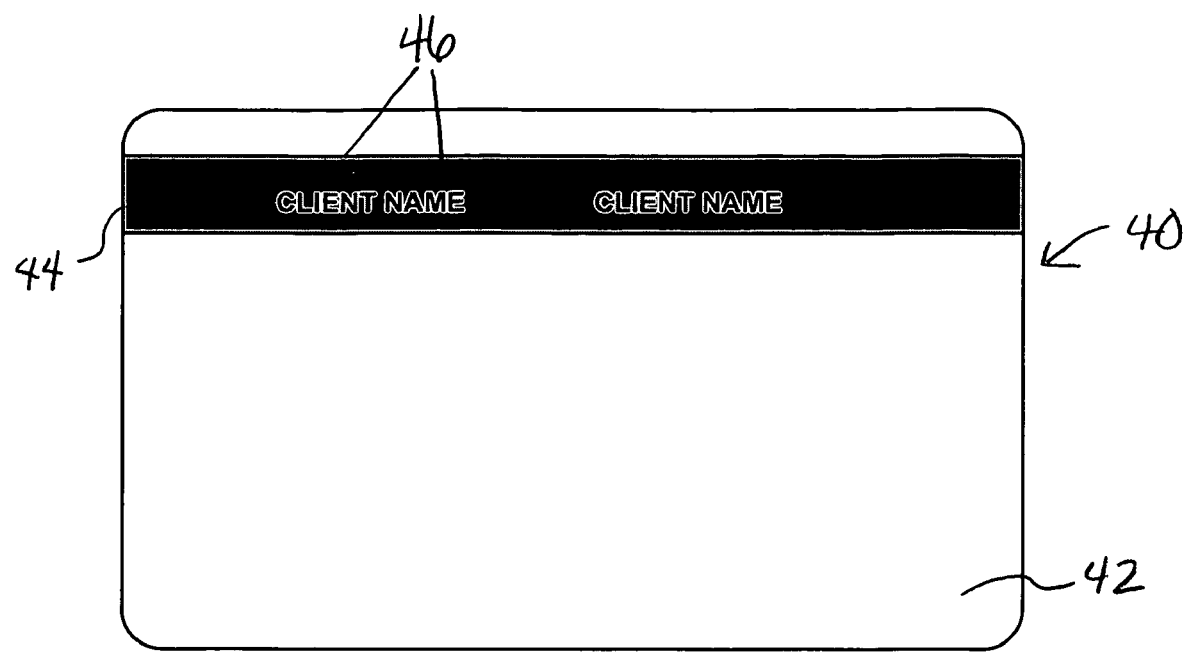
FIG. 4 illustrates an embodiment of a presentation instrument having one form of authentication indicia.

FIG. 4 illustrates another embodiment of a presentation instrument 40 that comprises a card body 42 having a magnetic stripe 44 as is known in the art. Formed directly on the magnetic media are markings 46 that are used to authenticate the presentation instrument. Examples of markings that may be used include the client name, client logos, other trademarks, certain symbols, and the like. These may be formed of a special ink or the like.

By including markings 46 on the magnetic stripe, the clerk who receives the presentation instrument 40 can inspect the markings 46 to see if they are included. If not, the clerk can refuse the card. Hence, markings 46 provide a convenient way for a clerk to determine whether the card is authentic or fraudulent.

Figure 5:
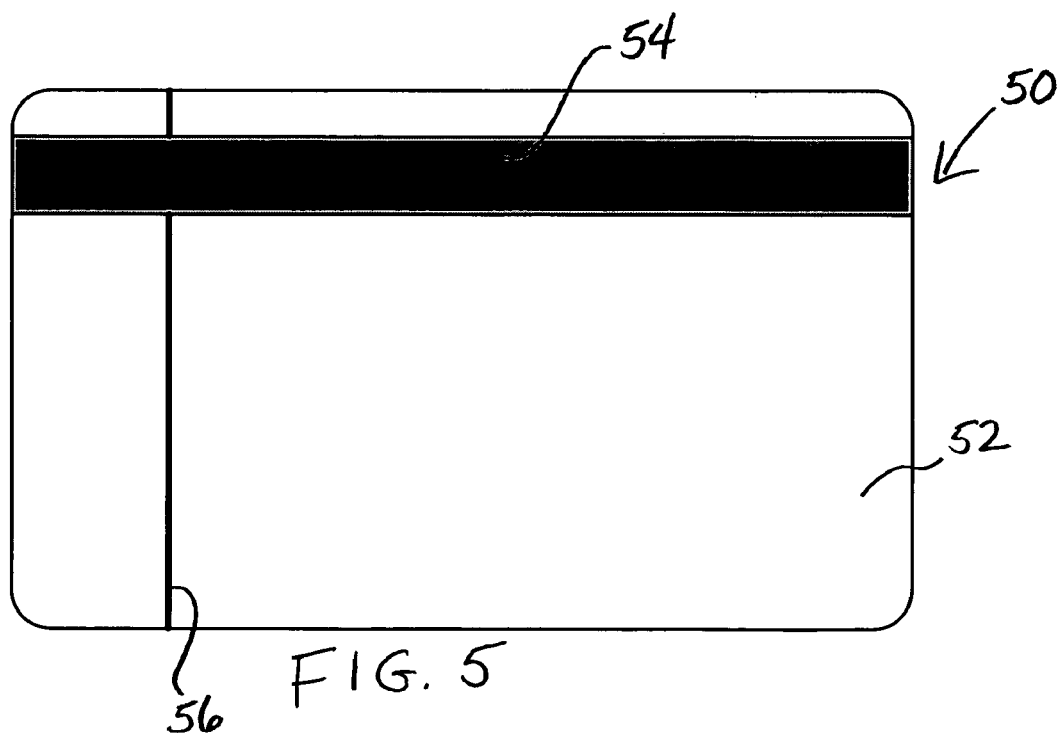
FIG. 5 illustrates an embodiment of a presentation instrument having another form of authentication indicia.

FIG. 5 illustrates an embodiment of a presentation instrument 50 that is constructed of a card body 52 having a magnetic stripe 54. Integrally formed within card body 52 is an identification marker 56 that indicates that the presentation instrument 50 is made from authentic card stock. In cases where card body 52 is made of a hard plastic, identification marker 56 could be a different colored plastic that is integrally formed within card body 52. Alternatively, identification marker 56 could be some type of distinguishing material placed over card body 52 and then laminated over it using a plastic coating. Instead of using a line as the identification marker, other shapes could be used such as circles, squares, specks, client logos, and the like.

Although the embodiments have been described with reference to using a magnetic stripe for holding the account information, it will be appreciated that other schemes could be used to include the account information, such as barcodes, human readable language, smart chips, RFID tags and the like. In such cases, the protective devices or authenticating indicia may be used in combination with these presentation instruments as well.

The invention has now been described in detail for purposes of clarity and understanding. However, it will be appreciated that certain changes and modifications may be practiced within the scope of the appended claims.

What is claimed is:

1. A presentation instrument comprising:

a card body having a magnetic stripe having machine readable account information stored thereon; and a protective device removably coupled to the card body by an adhesive so as to be disposed over at least a portion of the machine readable account information such that the machine readable account information is incapable of being read by a machine when the protective device is in place and the machine readable account information is readable by a machine when the protective device is removed, and wherein the protective device is removable by separating the protective device from the card body at the adhesive;

and wherein the protective device comprises a strip of material that covers the machine readable account information, the strip of material configured to generally conform to an outline of the magnetic stripe.

2. A method for producing a presentation instrument comprising:

encoding on a magnetic stripe of the presentation instrument machine readable account information; and covering at least a portion of the account information with a protective device, wherein the protective device is removably coupled to the presentation instrument with an adhesive so as to be removable without dismantling or disfiguring the presentation instrument;

and wherein the protective device comprises a strip of material that covers the machine readable information, and wherein the covering step comprises adhering the strip across the account information, and wherein the strip of material is configured to substantially conform to the outline of the magnetic stripe.

* * * * *